(12) United States Patent
Joos et al.

(10) Patent No.: US 10,895,749 B2
(45) Date of Patent: Jan. 19, 2021

(54) ELECTRONIC GLASSES AND METHOD OPERATING THEM

(71) Applicant: Visibil GmbH, Seengen (CH)

(72) Inventors: Roland Erich Joos, Langenthal (CH); Jörg Danzberg, Seengen (CH)

(73) Assignee: Visibil GmbH, Seengen (CH)

( * ) Notice: Subject to any disclaimer, the term of this patent is extended or adjusted under 35 U.S.C. 154(b) by 29 days.

(21) Appl. No.: 16/126,025

(22) Filed: Sep. 10, 2018

(65) Prior Publication Data

US 2019/0079291 A1 Mar. 14, 2019

(30) Foreign Application Priority Data

Sep. 8, 2017 (EP) .................................... 17190249

(51) Int. Cl.
| | | |
|---|---|---|
| *G06K 9/00* | (2006.01) | |
| *G02B 27/01* | (2006.01) | |
| *G09B 21/00* | (2006.01) | |
| *G06T 5/00* | (2006.01) | |

(52) U.S. Cl.
CPC .......... *G02B 27/0172* (2013.01); *G06T 5/009* (2013.01); *G09B 21/008* (2013.01); *G02B 2027/014* (2013.01); *G02B 2027/0112* (2013.01); *G02B 2027/0118* (2013.01); *G02B 2027/0178* (2013.01)

(58) Field of Classification Search
None
See application file for complete search history.

(56) References Cited

U.S. PATENT DOCUMENTS

| | | |
|---|---|---|
| 5,267,331 A | 11/1993 | Siwoff |
| 9,852,496 B2 | 12/2017 | Marchand et al. |
| 2010/0103186 A1* | 4/2010 | Luengen ............... G06F 3/14 345/589 |
| 2011/0122144 A1 | 5/2011 | Gabay |
| 2013/0120390 A1* | 5/2013 | Marchand ............. G06T 5/003 345/428 |

(Continued)

FOREIGN PATENT DOCUMENTS

| | | |
|---|---|---|
| EP | 2891966 A1 | 7/2015 |
| WO | 2011156721 A1 | 12/2011 |
| WO | 2016149737 A1 | 9/2016 |

OTHER PUBLICATIONS

Artal, "Calculations of two-dimensional foveal retinal images in real eyes", J. Opt. Soc. Am. A, 1990, pp. 1374-1381, vol. 7:8.

(Continued)

*Primary Examiner* — Suhail Khan
(74) *Attorney, Agent, or Firm* — The Webb Law Firm

(57) ABSTRACT

A method for operating electronic glasses including a display and a processor is provided. The method includes the steps of taking an image to be displayed as input data, distorting the original image through image manipulation executed by the processor in relation to the vision impairment based on predefined distortion criteria creating pre-compensated image data, first increasing the relative brightness of the pre-compensated image data generating increased brightness image data, second increasing the contrast of the increased brightness image data generating increased contrast image data, and displaying the generated image data on the display.

5 Claims, 13 Drawing Sheets

(56) References Cited

U.S. PATENT DOCUMENTS

2013/0215147 A1    8/2013   Hilkes et al.
2015/0192776 A1    7/2015   Lee et al.
2018/0064330 A1    3/2018   Markus et al.
2018/0365877 A1*   12/2018   Watola ................ G06T 11/60

OTHER PUBLICATIONS

Huang, "Dynamic Image Precompensation for Improving Visual Performance of Computer Users with Ocular Aberrations", FIU Electronic Theses and Dissertations, 2013, Paper 902, 135 pages.

* cited by examiner

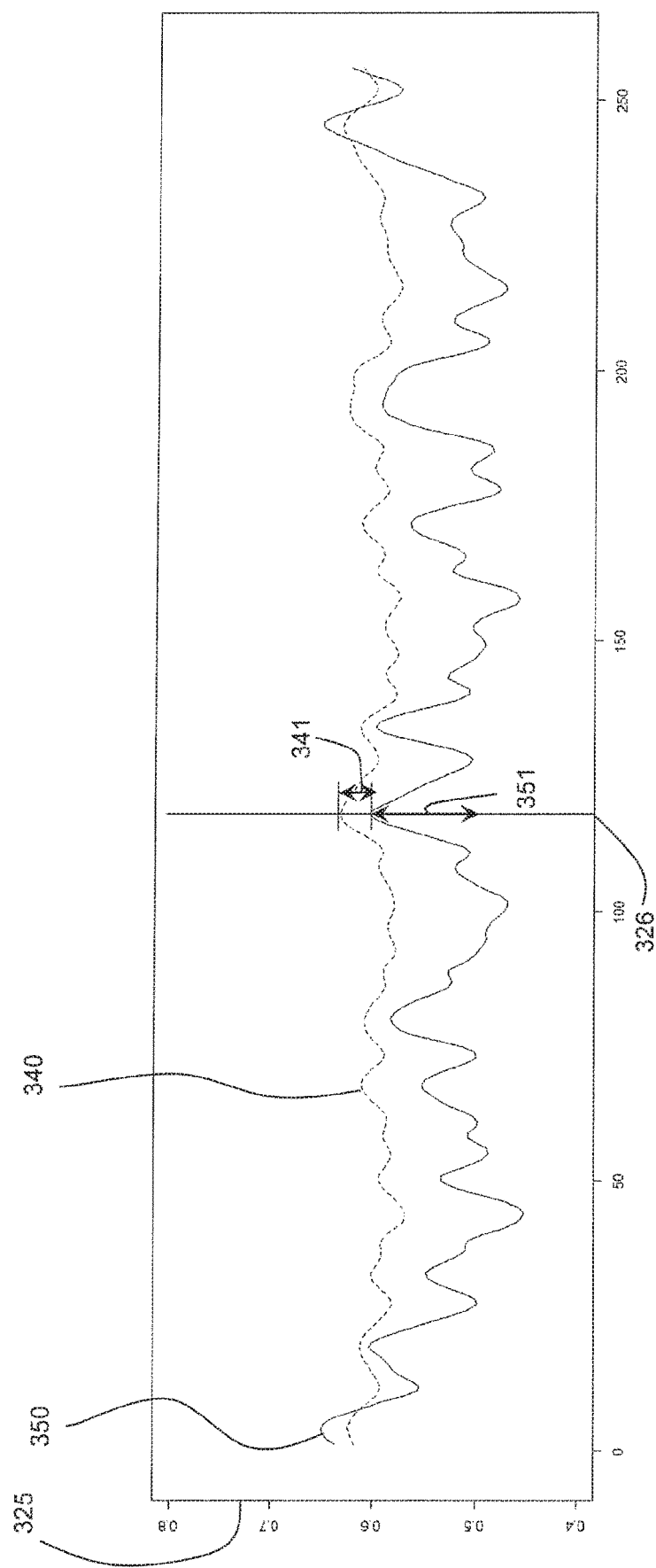

ELECTRONIC GLASSES AND METHOD OPERATING THEM

CROSS-REFERENCE TO RELATED APPLICATION

This application claims priority to European Patent Application No. 17 190 249.7 filed Sep. 8, 2017, the disclosure of which is hereby incorporated in its entirety by reference.

TECHNICAL FIELD

The present invention relates to electronic glasses and a method operating them; wherein the method for operating electronic glasses comprises a display and a processor, the method itself comprising: taking an image to be displayed as input data, distorting said original image through image manipulation executed by the processor in relation to the vision impairment based on predefined distortion criteria creating pre-compensated image data, and displaying the generated image data on the display.

PRIOR ART

WO 2016/149737 discloses a method for operating electronic glasses, comprising a display and a processor, wherein the method comprises: taking an image to be displayed as input, distorting said image through image manipulation, executed by the processor in relation to the vision impairment, based on predefined torsion criteria and displaying the distorted image on the display for the user.

FIG. 2a and FIG. 2b of WO 2016/149737 shows the principle of operation of the prior art method that an image shown on the display of a smartphone is distorted so that a user, being impaired, sees an improved image.

A similar approach is shown by Jian Huang in his publication "Dynamic Image Precompensation for Improving Visual Performance of Computer Users with Ocular Aberrations" in FIU Electronic Theses and Dissertations, Paper 902, 2013.

EP 2 891 966 also provides a device for an improved visual presentation of information for the partially sighted, wherein the adaption is made directly in the glasses.

Glasses or electronic glasses in the context here are not only related to the traditional original definition of transparent moulded, cut and/or polished lenses but also relate to displays, especially electronic screens as LED screens which provide the same functionality for the human eye for a specific given information as the combination of traditional lenses and a traditional (=standard) representation of said information. Information can be text, graphics or any combination of these.

US 2011/0122144 discloses a data processing system for overcoming at least one vision impairment of a user, comprising a control unit connected to a display, wherein the control unit is arranged to distort a plurality of original images in relation to the at least one vision impairment and predefined criteria, wherein the result of this handling is that the distorted images are shown on a display and that the user, suffering from the vision impairment, perceived the distorted images as a healthy user would perceive the original image.

WO 2011/156721 relates to a computer-implemented method for rendering on a display of an electronic device a pre-corrected image of an original image to compensate for a viewer's visual impairment.

US 2013/215147 discloses a method of augmenting a user's sight comprising obtaining an image of a scene using a camera carried by the individual, transmitting the obtained image to a processor, selecting an algorithm of a plurality of spectral, spatial, and temporal image modification algorithms to be applied to the image by the processor, modifying the using the algorithm substantially in real time, and displaying the modified image on a display device worn by the individual.

SUMMARY OF THE INVENTION

It is an object of the present invention to provide electronic glasses, having an improved functionality, a quicker response and an easier adaptability to commercial displays, providing the improved vision for user stemming from at least one vision impairment.

A method for operating electronic glasses comprising a display and a processor comprises the steps of taking an image to be displayed as input data, distorting said original image through image manipulation executed by the processor in relation to the vision impairment based on predefined distortion criteria creating pre-compensated image data, first increasing the brightness of the pre-compensated image data generating increased brightness image data; and second increasing the contrast of the increased brightness image data generating increased contrast image data and displaying the generated image data on the display.

The brightness of the pre-compensated image data is increased in relation to the brightness spread of the original image, allowing for loss of image information.

A method controlling electronic glasses with the above mentioned features provide an improved image, increasing initially the relative brightness of the image, while increasing the contrast and dynamic range of the image in a second step turning out in an improved image of lower overall brightness.

In a preferred embodiment of the invention the control unit provides a distorted image, which is transformed in complementary colors of a colour model to further enhance the user experience.

One of the oldest is the Color Star of Charles Blanc. Complementary colours appear grey, if dots of these closures are placed side by side, in partitive color mixing. Further colour models are the RGB colour model and HSV colour model, each defining for someone skilled in the art complementary colours.

The known step of distorting an original image through image manipulation executed by a processor in relation to the vision impairment based on predefined distortion criteria to create pre-compensated image data can be executed in various ways as known to someone skilled in the art. Distortion of an original image through image manipulation is based on the degree of vision impairment which is based on predefined distortion criteria as degree of astigmatism, defocus and information relating to the pupil of the user. The method step of creating distorted image data can comprise calculation of an inverted point spread function on the basis of said predefined distortion criteria based on said vision impairment and a de-convoluting step of the result with the original image data.

Such electronic glasses comprise an electronic communication apparatus, especially a smart phone or a computer with display and a computer program product configured to execute the method steps of the above mentioned method.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIG. 13 shows a diagram of the calculated image on the retina, which is recognized by an impaired user, of the line precompensated in the traditional way as such (dotted curve) and precompensated according to the invention for increased dynamic range and contrast (solid curve); respectively.

DESCRIPTION OF THE INVENTION

Figure 1:
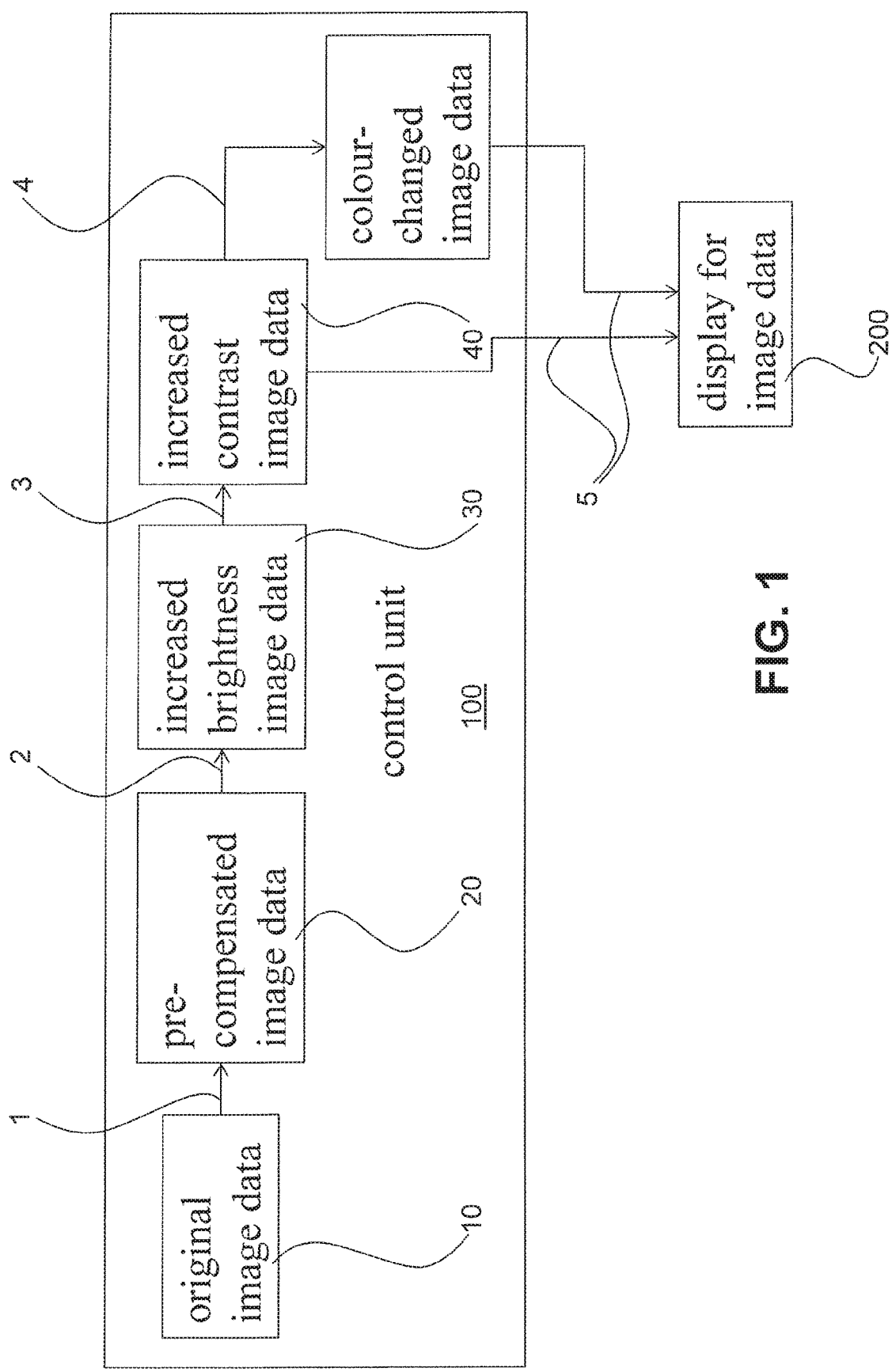
FIG. 1 shows a schematic block diagram of a data processing system used within an electronic glasses system according to an embodiment of the invention.

Smartphones become more and more a useful device in the daily life of users. The users often need specific glasses to read the smaller display of such smartphones compared to the displays of standard computers or the displays of tablets.

Starting from an age of approximately 45 years, the possibility of adaptation of the eyes is reduced in the near field. The eye is more and more less able to present an image in the usual reading distance. It is necessary for people to use glasses or contact lenses to read. People, not being used to glasses, are usually trying to avoid using glasses and it would be an asset for the usability of e.g. smartphones, if electronic glasses could overcome this age-based impairment.

The publication of Jian Huang uses an inverse Fourier transformation to help users having complex impairments in order to allow them to use displays of computers. The basic idea of said prior art publication is to handle an impairment as a disturbance of a wavefront of a perfect wave. The difference between the two wavefronts can be described with Fourier series. The wave-front aberration can be used to calculate the image a user with visual impairments would perceive. This procedure is well known and described e.g. by Artal (P. Artal, Calculations of two-dimensional foveal retinal images in real eyes, J. Opt. Soc. A/Vol. 7, No. 8/August 1990). The key steps in doing so is applying Fourier transforms and calculating the so called point spread function PSF in the spatial domain. The PSF is unique for a given subject, i.e. visual impairment of a particularly visually handicapped user. The coefficients of these equations can be determined by measuring the aberration or other impairments of the user. When using these coefficients in the Fourier series and applying them for an existing image, then the image can be calculated, which is perceived by the user, i.e. the image as perceived on the retina. The PSF comprises all parameters relevant for the imaging of a point of an object on the retina, e.g. size of the pupil, defocus, distance of the object and others. The PSF in the position space is an array. Inverting the transformation formula and using it on such an existing image, then a distorted image is achieved, which can be viewed by the visually impaired without glasses. Jian Huang e.g. provides examples of pre-compensation based on an aberrated eye with −5.8 D spherical error and −1.8 D cylindrical error with 2° axes. The corrected image is of good quality with the caveat that the contrast is quite low.

Each optical vision impairment is associated with specific criteria relating to the so called point spread function or PSF for short. Application of such a calculated PSF for a given vision impairment on an original image gives a blurred image. The application of a PSF on an original image is called convolution. Such a blurred image is the image the specific vision impaired person would see looking onto the original image without using any vision correction, like glasses or lenses. Solving the inverse problem generates the inverse point spread function or iPSF for short. Applying the iPSF to the original image one gets the so-called pre-compensated image. The procedure of applying an iPSF to an arbitrary image is called de-convolution and is of course also a convolution step. The pre-compensated image is the image the particular vision impaired person would perceive as being very similar to the original image, hence being less distorted and having much better image quality.

In order to obtain the iPSF from the PSF, a Fourier-transformation in the frequency domain is executed to calculate the inverse PSF which is called a Wiener deconvolution or filtering. After having calculated the Inverse in the frequency domain, the result is transformed in the position space. Application of the iPSF on any image (as a pixel image) provides a pre-compensated image.

Within the handling of images it is known to use filters to improve the contrast in a pre-compensated image but the application of these filters reduces the effect of the pre-compensated image. The invention is based on the insight, that a better result can be achieved if the brightness of the image is increased, followed by a contrast increase, which two steps can be accompanied and followed by the use of complementary colors on the resulting image, which provides an improved readability of texts and recognisability of images. Only with the application of such a handling, it is possible to really use pre-compensated images as presented above.

The inventors have seen that increasing the brightness of an image has a physiological reaction from the user and his pupil has an automatically shrinking diameter when the brightness of the image perceived is raised. Such a reduction of the diameter of the pupil automatically provides a sharper and more contrasted reception of the image. In order to achieve this reaction, the technical brightness of a display can be increased. However, the technical brightness of an image of a display can only be raised to some extent since otherwise the image is to be found as glaring which has a negative impact if such images are to be viewed for a longer period of reading time. On the other side, increasing the brightness of an existing image reduces the contrast in the pre-compensated image. By pushing the lower limits of the interval of the grey-scale values of an image, it is possible to make the appearance of an image as such (without changing the technical brightness of the display) brighter without losing image information.

As an example, the brightness of an image is considered to be 100 cd/m$^2$. Doubling this brightness to 200 cd/m$^2$ reduces the diameter of the pupil by 0.7 mm from 3.2 mm to 2.5 mm. Doubling the brightness according to the invention can be reached through scaling the grey values not as usual between 0.0 and 1.0 (wherein black is 0.0 and 1.0 is white) but the scaling takes place between 0.5 and 1.0. The values of the brightness chosen between 0 and 1 starts from a calibration of the technical predetermined luminance of a device to values of maximum darkness for 0 and maximum light intensity for 1.

FIG. 1 shows a schematic block diagram of a data processing system used within an electronic glasses system according to an embodiment of the invention. The system can be integrated as a computer software product in an existing computer device as a personal computer or a smartphone, comprising a control unit 100 having a processor, data storage and program storage elements and a display 200. Usually some kind of input member is provided which can be a physical keyboard or an on-screen keyboard.

The display 200 is configured to show an image which is a set of x times y pixel, wherein x and y are figures as e.g. 1280 times 1024 or any other usual resolution with a predefined number of colours in the image, which image display can also be grey-scale.

The device 100 receives information to be displayed on a display 200. This can be a pure image or a mix of image and text or a pure text representation. Text is usually related to the representation of alpha-numerical characters. In the present context "image data" is related to an array of information to be bit-mapped onto the physical display array.

This information is handled in control unit 100 and is meant to be represented by original image data 10. Then according to the method of the invention initially a pre-compensation step is applied to the original image, creating preliminary pre-compensated image data 20. Then the brightness of this preliminary pre-compensated original image data is increased. Beside increasing the technical brightness, the relative brightness can be increased. This increased brightness data 30 is then used to be transformed in the next method step. The contrast is raised to produce increased contrast image data 40 from the preliminary pre-compensated increased brightness image data 30. Then the result of this method step is delivered to the display 200 to represent this transformed data, which would be considered by a non-impaired user to be distorted data.

According to a further embodiment of the invention, this result stemming from the method step generating increased contrast data 40 can be transformed in a further step to generate colour-changed image data 50, which can be a false-colour transformation. Then this further transformed data is in said alternative embodiment provided to display 200.

Figure 2:
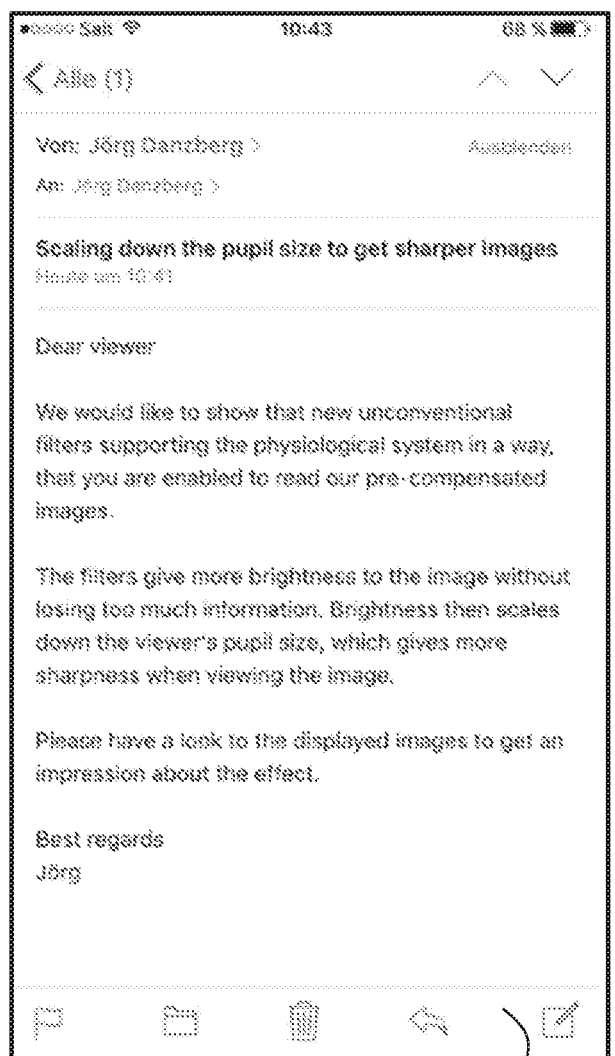
FIG. 2 shows a print screen from a display of a smartphone, displaying an email according to a traditional representation for the non-impaired user.
Figure 3:
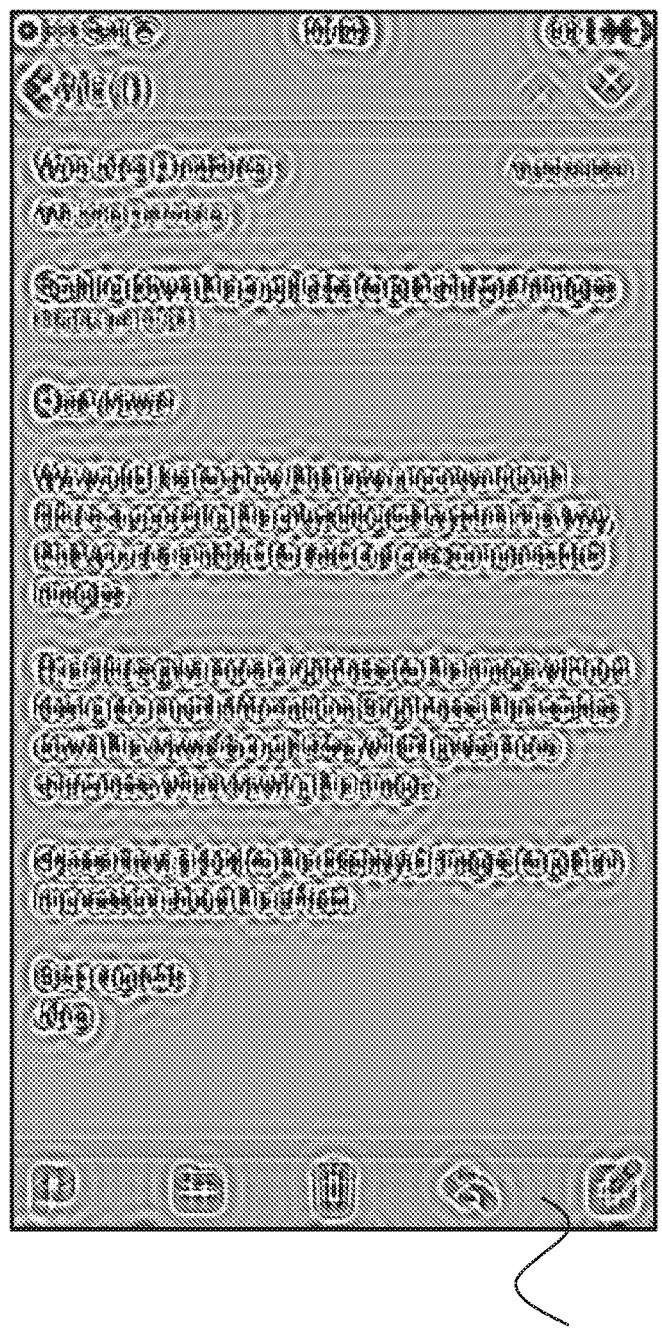
FIG. 3 shows a print screen from a display of a smartphone, displaying the email of FIG. 2 after a first transformation step according to an embodiment of the present invention for the impaired user.
Figure 4:
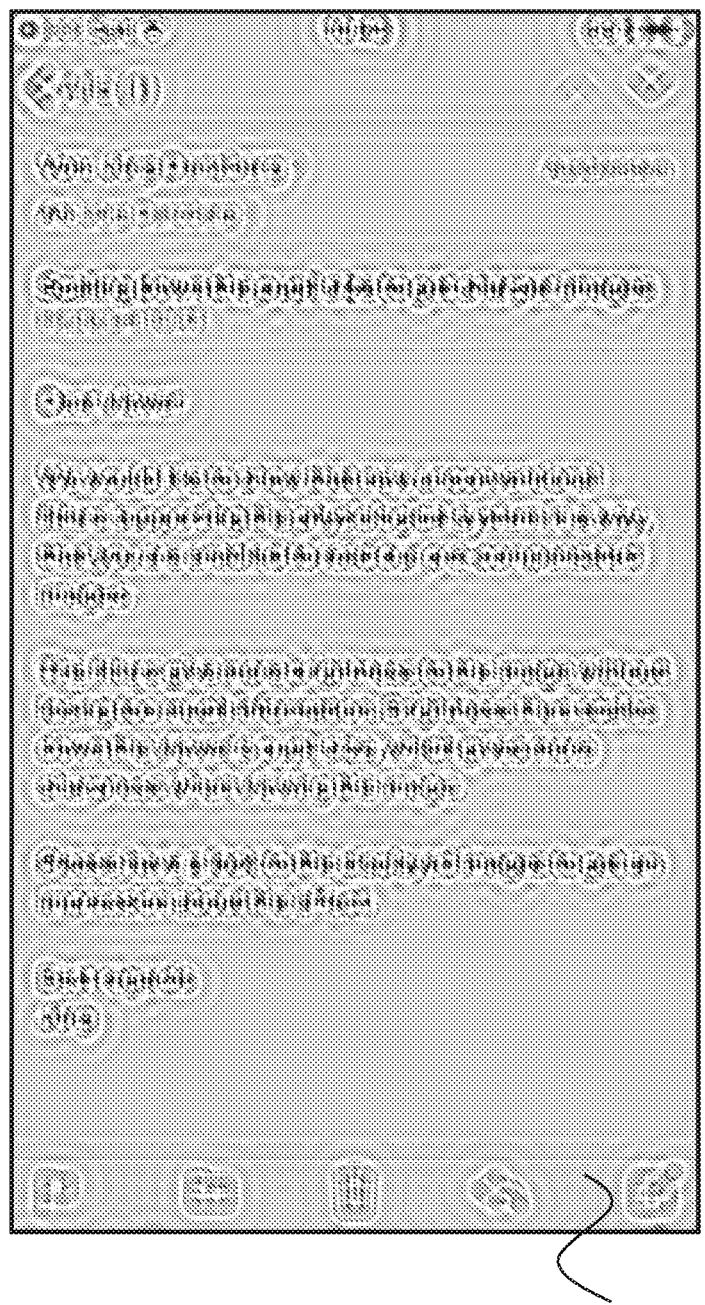
FIG. 4 shows a print screen from a display of a smartphone, displaying the email of FIG. 2 after the modification according to FIG. 3 after a second transformation step.
Figure 5:
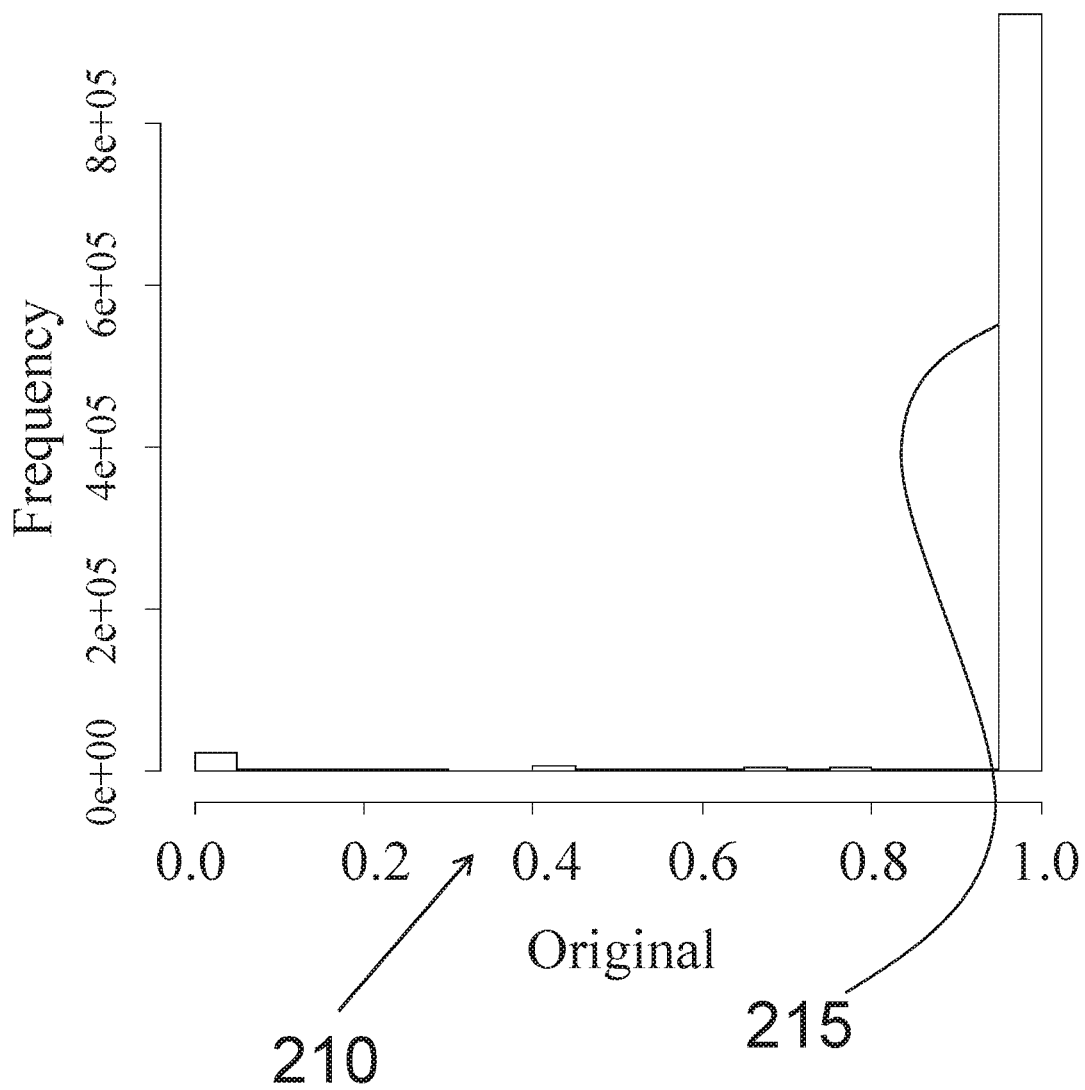
FIG. 5 shows the histogram for the representation of FIG. 2 for an intensity between 0 and 1 against the frequency/counts/number of occurrences.
Figure 6:
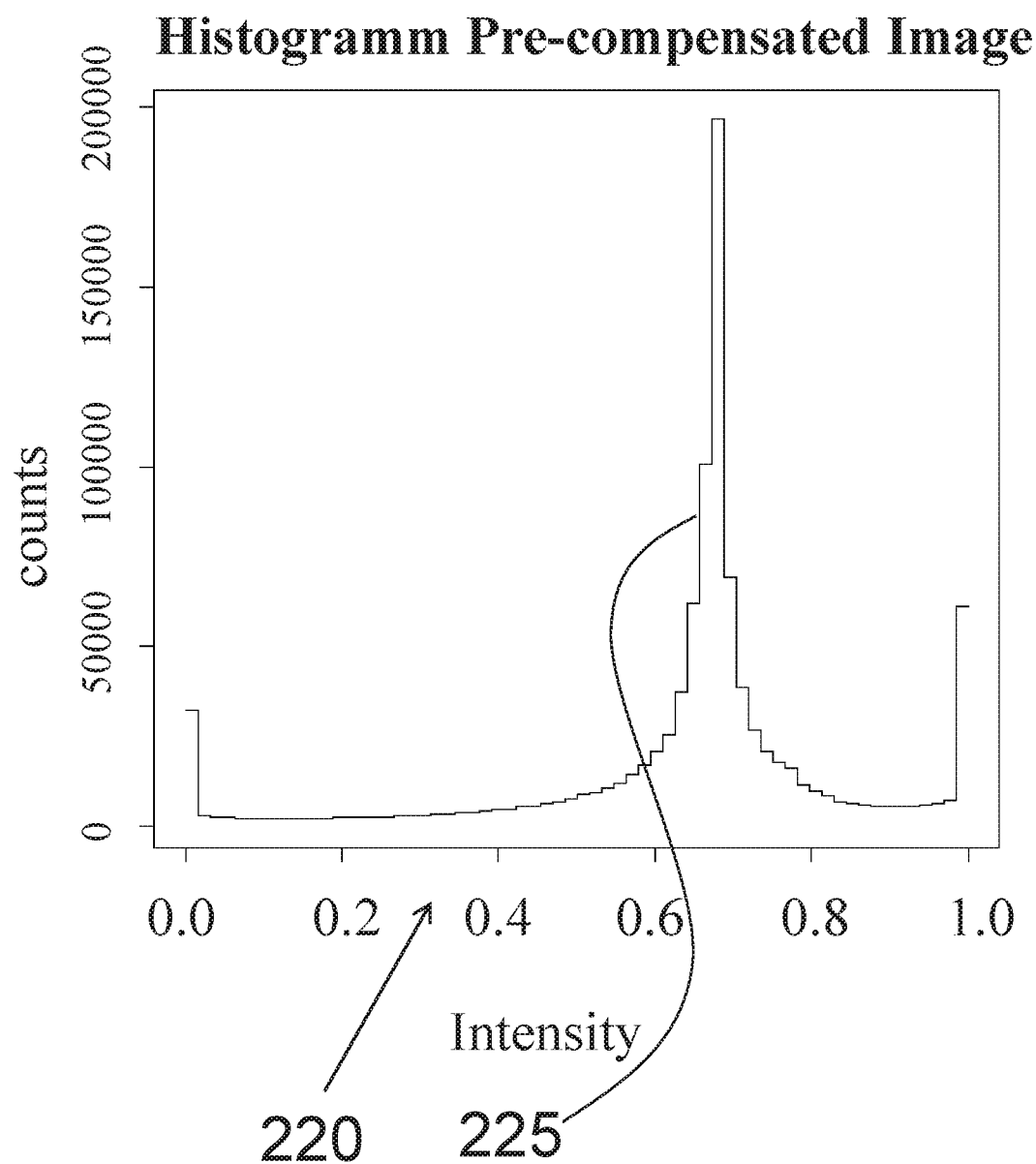
FIG. 6 shows the histogram for the representation of FIG. 3 for the intensity between 0.5 and 1 against the frequency.
Figure 7:
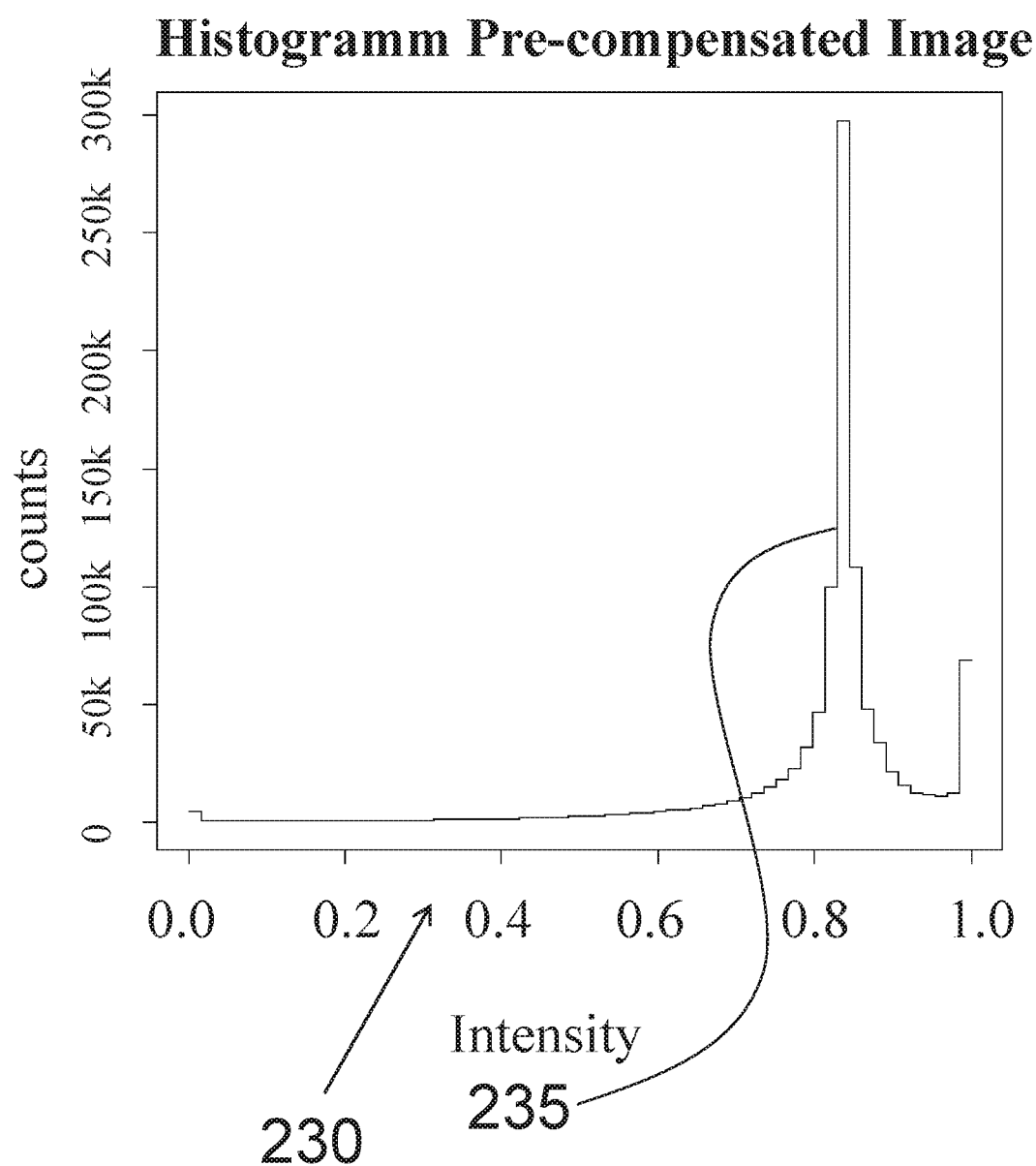
FIG. 7 shows the histogram for the representation of FIG. 4 for the intensity between 0.75 and 1 against the frequency.

Now embodiments of the invention are explained in connection with FIGS. 2 to 7, wherein FIGS. 2 to 4 show different print screen from a display 200 of a smartphone having said control unit 100. FIGS. 5 to 7 show the corresponding histograms for the representation of FIGS. 2 to 4, respectively.

In detail, FIG. 2 displays an email according to a traditional representation for the non-impaired user; FIG. 3 shows a print screen from the display of a smartphone, displaying the email of FIG. 2 after a first transformation step according to an embodiment of the present invention for the impaired user; and FIG. 4 shows a print screen from the display of a smartphone, displaying the email of FIG. 2 after the modification according to FIG. 3 with a second transformation step according to said embodiment of the present invention.

FIG. 2 shows the image of the smartphone display according to a traditional representation 110 for the non-impaired user. The associated histogram 210, according to FIG. 5, shows a peak at approximately 0.0 and a peak 215 at approximately 1.00 intensity. The ordinate reflects the count of pixels of the image. This relates to all image pixels as the black coloured, mainly text, portions of the displayed information as well as to the white back-ground.

FIG. 3 shows the email of FIG. 2 with a pre-compensated image 120 achieved by transformations, especially inverse Fourier transformation as will be explained further below. The histogram 220 of the data shown in FIG. 3, according to FIG. 6, shows narrow peaks at approximately 0.65 and 1.00 intensity. In other words, through applying the later explained transformations, the image becomes blurred for the non-impaired user and this transformation reduces the former intensity peak at 1.00 and creates a distribution 225 around 0.65 between approximately 0.55 and 0.80.

FIG. 4 shows the email of FIG. 3 after a method of increasing brightness had been effected, e.g. it reflects a pre-compensated email with increased brightness image 130 and FIG. 7 shows the histogram 230 of FIG. 4. The increasing of the brightness is reflected in FIG. 7 through moving the distribution 225 of FIG. 6 to a higher average brightness value as distribution 235, wherein the maximum intensity of this distribution 235 is now at around 0.825 as well as still the peak 1.000. The distribution 235 has narrowed to an interval of about 0.75 to 0.9.

The images of FIG. 2 to FIG. 4 generating a "distorted" image to be seen by a partially impaired user on the screen 200 as improved quality image were generated based on a typical user and the following situation: +2 D, measured 3.4 mm diameter of the pupil under usual conditions, i.e. sufficient lighting conditions allowing to read the display and no dazzle effects on the display 200, and 30 cm distance of the eye to the reading surface from the display 200.

The FIGS. 2 to 4 as well as FIGS. 5 to 7 show a specific case of raising the brightness after applying the pre-compensation step. The contrast is calculated as follows: For the pre-compensated image without increasing the brightness, the histogram 220 shows a peak at 0.65 and a peak at 1.00, wherein with an increase of the brightness the histogram 230 shows one peak at 0.825 and a further one at 1.00.

The contrast $k_{without} = (1-0.65)/(1+0.65) \approx 0.21$.

The contrast $k_{with} = (1-0.825)/(1+0.825) \approx 0.10$.

The brightness increase generates a contrast $k_{with}$ which is two times smaller (changing it from 0.21 to 0.10) which is against the intuition and nevertheless it achieves a better readability of the pre-compensated image.

The brightness after the increase of the brightness is based on:

$$I' = I_0 + (1-I_0)*I$$

I: relative intensity (brightness) of the image before the increase of the brightness I': relative intensity of the image after the increase of the brightness $I_0$: minimal relative image brightness of the image The values I, I' and $I_0$ are relative intensities, taking values between 0 and 1.

After the increase of the brightness in a first increase step, the contrast is increased in a second increase step to use a maximal possible contrast interval to increase the relevant contrast differences. The contrast increase can be provided in three steps:

Step 1: normalizing the brightness through transformation of the images into the interval 0,1] based on Wiener de-convoluted images as:

$$I' = \frac{I - I_{min}}{I_{max} - I_{min}}$$

with:

$I_{min}$: minimal image intensity of the pre-compensated image $I_{max}$: maximum image intensity of the pre-compensated image I: image intensity of the pre-compensated image I': intensity of normalized image Step 2: relates to the calculation of the average brightness value $$\bar{I} = \frac{1}{N}\sum I_i$$

$I_i$: Intensity of the pixel i

N: number of pixels of the given image.

$\bar{I}$: average image intensity

Step 3: relates to the contrast increase.

$$I' = KPC \cdot (I - \bar{I})$$

$$I'' = \begin{cases} 1 & I' > 1 \\ I' & 0 \leq I' \leq 1 \\ 0 & I' < 0 \end{cases}$$

with:

KPC: value of the contrast increase (predetermined variable), KPC may theoretically assume values in the range of 1 to infinity, reasonably in the range of 1 to 100

I'': intensity used after having worked on the entire algorithm

Based on the above approach an improved image is achieved.

Said image can even be improved further by using complementary colors. Such a colour-scheme can be used in view of the fact that users are advancing that pre-compensated images are readable and visible for a short time but that the eyes always try to focus on the plane of the display 200. The images can only be seen as sharp and focused, if the user is looking "through" the display 200.

The inventors have seen by using test series with actual users, that changing the pre-compensated images 20 into complementary colors can suppress this natural reaction of the physiological viewing system. In the embodiment shown in FIG. 1, the use of complementary colors is effected after the increase of contrast of the image data, i.e. as the last transformation and the result is shown on display 200. This enables the user to be focused on the text portions without trying to focus on the display plane. When starting from a black-white environment in the display 200, as usually applied for reading texts (black letters on a white or light grey background surface), the inventors have seen that the color pair yellow-blue provides an improvement since it hinders the usual automatically setting in accommodation. This is in contrast to the use of the color pair red-green, which, in the test series, did not provide an improvement of this retardation of the accommodation.

In order to use the black and white color representation in the RGB color representation into a blue-yellow screen, the following transformation is used: It is assumed that the gray values $I_{gray}$ are represented in the interval [0,1] wherein 0=black and 1=white.

$$I_{red} = I_{gray}$$

$$I_{green} = I_{gray}$$

$$I_{blue} = 1 - I_{gray}$$

The above conversion works for the technical implementation of the method for traditional RGB based displays 200. Someone skilled in the art can of course use a transformation in the YCbCr or other color spaces.

The use of the three steps mentioned above, brightness increase, contrast increase and use of complementary colors, provide a further increased readability for the users.

Figure 8:
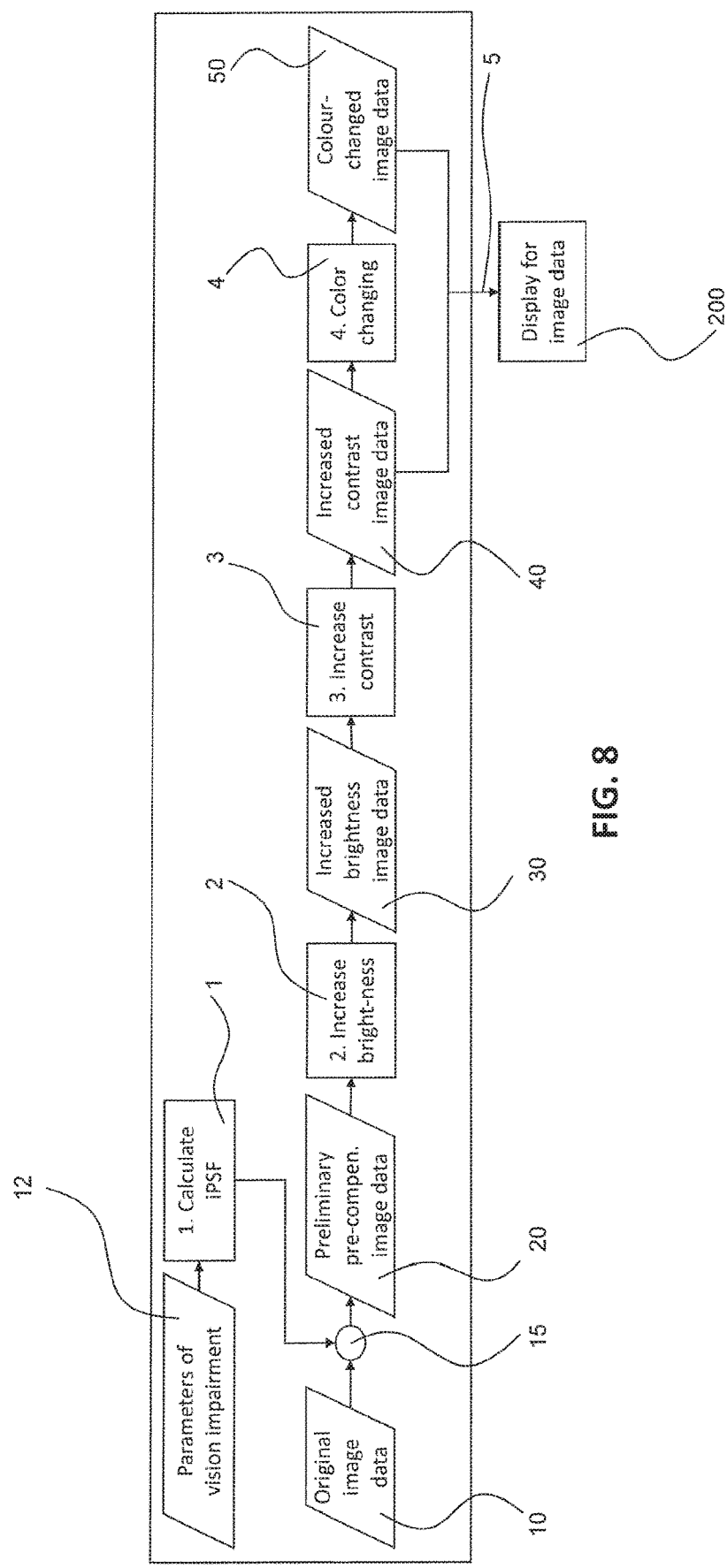
FIG. 8 shows a more detailed schematic block diagram of a data processing system used within an electronic glasses system according to the embodiment of FIG. 1.

As mentioned above FIG. 1 shows a schematic block diagram of a data processing system used within an electronic glasses system according to an embodiment of the invention, where the preliminary pre-compensated image, i.e. the convolute result of the iPSF plus the original image data, is made brighter, followed by the method step of increasing the contrast. FIG. 8 shows a more detailed schematic block diagram for this embodiment. All reference numerals of FIG. 1 are used in FIG. 8 in the same way as in FIG. 1. FIG. 8 additionally explains that the preliminary pre-compensated image data 20 is achieved through providing parameters of vision impairment 12, a calculation 1 of the iPSF for these impairment on one side and providing the original image data 10 on the other side. These two image data sets are added in step 15 which comprises a de-convolution step 15. As in FIG. 1 the colour changing step 4 is an optional step.

Of course it is also possible to provide a different approach in the sequence of the method steps of de-convolution step 15 and the steps of increasing brightness 2 and increasing contrast 3.

Figure 9:
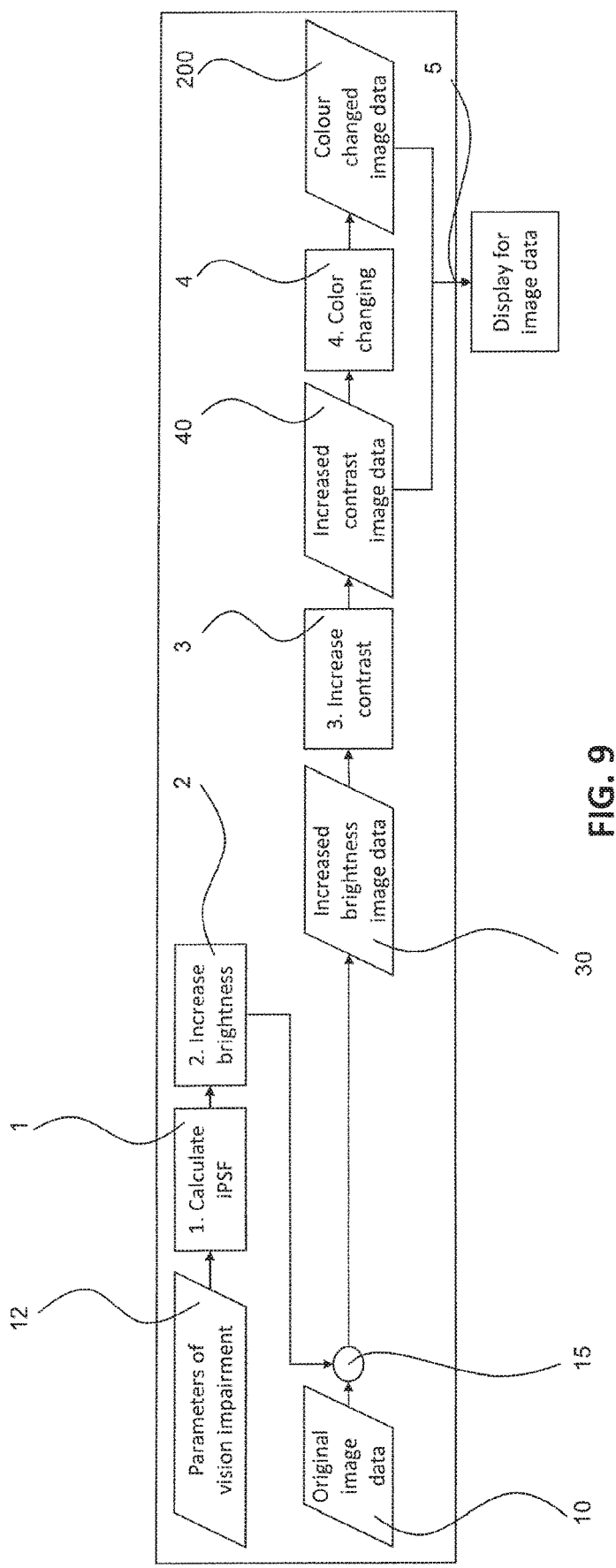
FIG. 9 shows a more detailed schematic block diagram of a data processing system used within an electronic glasses system according to a second embodiment according to the invention.

FIG. 9 shows a detailed schematic block diagram of a data processing system used within an electronic glasses system according to a second embodiment according to the invention.

Here, the calculation of the iPSF is immediately followed by the step of increasing brightness 2 before the de-convolution step 15 with the original image data is executed. Then the pre-compensated image data 30 has already increased brightness and the increase contrast step 3 follows as in the embodiment of FIG. 8.

Figure 10:
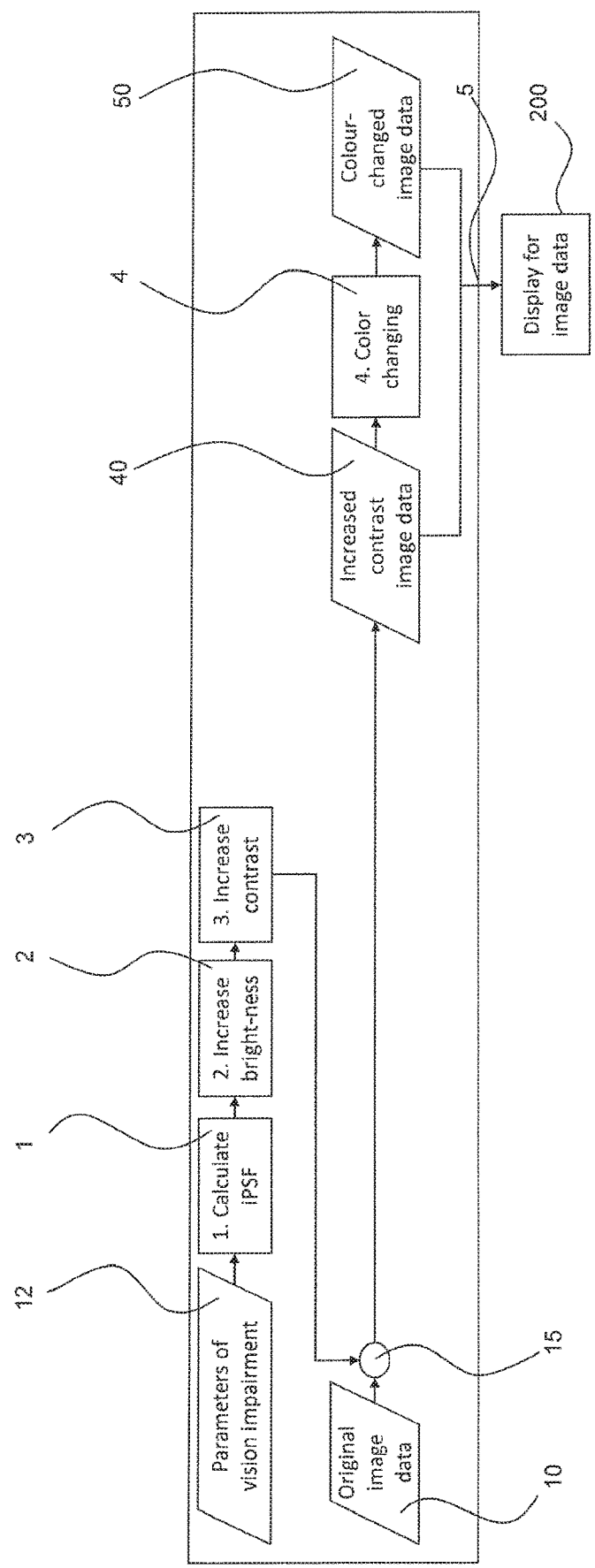
FIG. 10 shows a more detailed schematic block diagram of a data processing system used within an electronic glasses system according to a third embodiment according to the invention.

FIG. 10 shows a detailed schematic block diagram of a data processing system used within an electronic glasses system according to a third embodiment according to the invention.

Here, the calculation of the iPSF is immediately followed by the step of increasing brightness 2 and the increase of contrast step 3 before the de-convolution step 15 with the original image data is executed. Then the pre-compensated image data 40 has already increased brightness and so that only the optional colour-change step 4 is executed.

It is an advantage of the method according to the embodiments according to FIG. 9 and FIG. 10 that the increase of brightness and optionally the contrast increase is already directly applied on the iPSF and only then the de-convolution with the original image data is to be performed.

Figure 11:
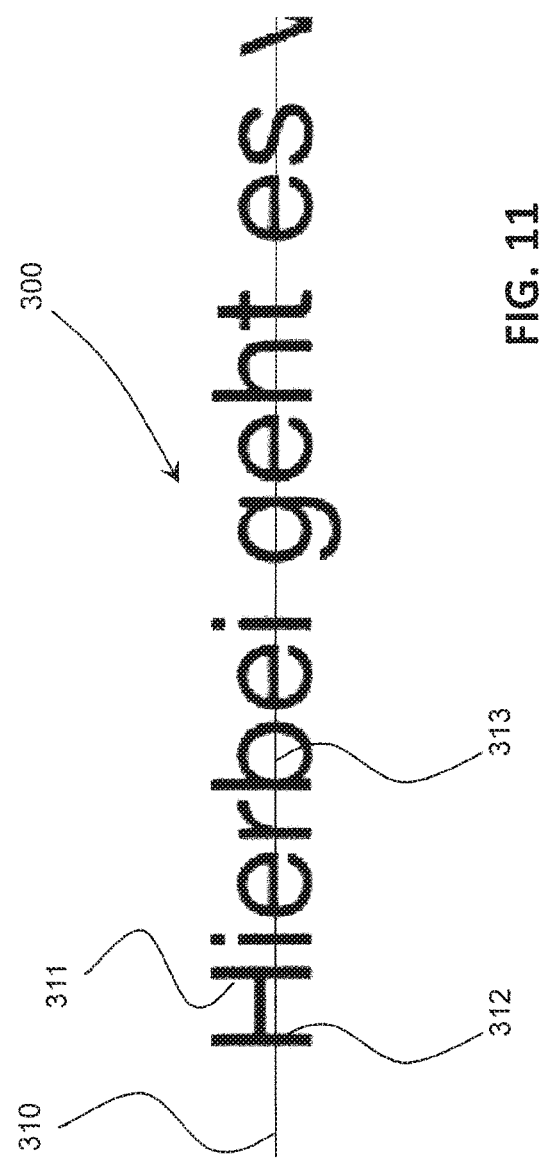
FIG. 11 shows a line of text with a horizontal line for which the increase of the dynamic range and contrast for each pixel along the line according to an embodiment of the present invention for the impaired user is explained in connection with FIGS. 12 and 13.
Figure 12:
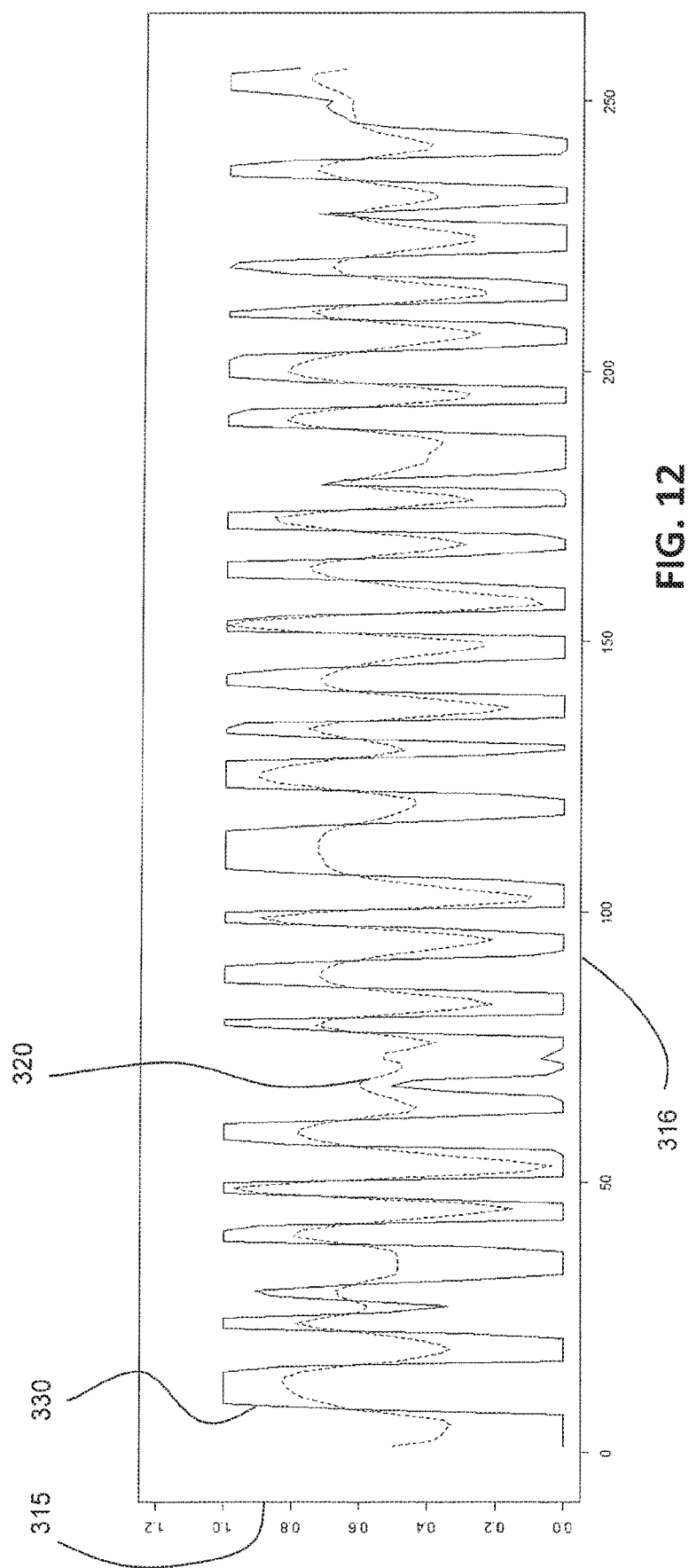
FIG. 12 shows a diagram of the brightness values of the pixel along the line of FIG. 11 for a precompensated image of said line, as such (dotted curve) and according to an embodiment of the invention (solid curve), respectively.

FIG. 11 shows a line of text 300 comprising letters 311 with a horizontal line 310. The text 300 comprises letters 311 as "H" and "b" but can comprise symbols and further elements as well. The horizontal line 310 is drawn in FIG. 11 to visually show the reader of this specification which part of the text is used to be treated according to an embodiment of the invention and for which the diagrams of FIGS. 12 and 13 are calculated. The impaired user has a pupil diameter of 3.2 mm; a defocus of 2.2 dpt and an astigmatismus=0. The line itself is not part of the line of text 300 when this line is shown to a user or when the precompensation calculation takes place. FIG. 12 shows a diagram of the brightness values of the precompensated pixel along the line 310 of FIG. 11, wherein the dotted line 320 shows the brightness value of traditionally precompensation pixel (as pixel 312 and pixel 313) on line 310 as such and the solid line 330 shows the brightness value of these pixel according to a precompensated image according to the invention of the pixels along said line. FIG. 13 then shows a diagram of the calculated image on the retina, which is recognized by an impaired user, of the line precompensated in the traditional way with dotted line 340 and precompensated as a solid line 350 for increased dynamic range and contrast according to the invention.

As said above, the text of FIG. 11 comprises black pixel 312 and white pixel 313, since the printed text is black and white. It is possible that there are grey values as such or in a interpolated. Black pixel 312 is part of the letter "H" and white pixel 313 is part of the inner white space of the letter "b".

FIG. 12 shows the brightness value 315 on a scale from 0 to 1 for which the increase of the dynamic range and contrast, calculated for each pixel along the line 310 of text 300 according to an embodiment of the present invention for the impaired user is shown with solid line 330, having mostly values of 0 and 1. The traditionally precompensated pixel follow the dotted line 320 with far less spread of brightness values. The x-axis 316 reflects the position of pixels from 0 to 250 which is here the resolution of the horizontal direction of text line 300, i.e. one line of an array of pixel.

FIG. 13 shows the brightness value 325 on a reduced scale from 0.4 to about 0.7 for which the increase of the dynamic range and contrast, calculated for each pixel along the line 310 of text 300 according to an embodiment of the present invention for the impaired user is shown with solid line 350 compared to the calculation of the image on the retina of an impaired user without the increase of the dynamic range and contrast as shown in dotted line 340. It is noted that the average brightness is substantially lower in the case of the application of the method of the invention. It is around 0.6 in the traditional compensation scenario whereas it is around 0.5 in the case of the present invention.

The increase of the dynamic range and contrast is visible over the entire length of the compensated line of pixels. At position 326 around pixel 130 (out of above 250 pixel) the dynamic range 351 around this pixel is far higher for the precompensated case according to an embodiment of the invention than the dynamic range 341 for the traditional approach. The information content of the calculated image is reduced and the dynamic range, i.e. the contrast in the applicable available range, is increased. This is true for both FIG. 12 and FIG. 13, i.e. the precompensated image according to the invention as for the calculated image for the retina of an impaired user.

In the case of one or more grey dots on a white background, which could be a text line as in FIG. 11 or an image as such, the first handling step of the preliminary precompensated image data makes the grey dots brighter, i.e. turn them in a lighter grey. In the second step, this increased brightness image data is transformed into increased contrast image data which necessarily reduces the overall brightness of the image, since the white dots remain mainly white whereas the grey dots become darker again.

The invention claimed is:

1. A method for operating electronic glasses comprising a display and a processor, the method comprising:
    taking an original image to be displayed as input data;
    distorting said original image through image manipulation of the input data executed by the processor in relation to a vision impairment based on predefined distortion criteria comprising calculation of an inverted point spread function on the basis of said predefined distortion criteria based on said vision impairment and a de-convoluting step of the result of the inverted point spread function with the original image data creating pre-compensated image data;
    a brightness increasing step, wherein the brightness of the pre-compensated image data is increased generating increased brightness image data;
    a dynamic contrast range increasing step, wherein the dynamic contrast range of the increased brightness image data is increased generating increased dynamic contrast range image data as output image data to be displayed; and
    displaying the generated output image data on the display.

2. The method according to claim 1, wherein the increased dynamic contrast image data is transformed before the display step into color changed image data comprising a set of complementary colors based on a predetermined color model.

3. The method according to claim 2, wherein the set of complementary colors comprises a yellow-blue scheme.

4. Electronic glasses for a visually impaired user, comprising a computer program product provided to be executed on a processor of a visual communication apparatus having a display, wherein the computer program product comprises an inverted point spread function module to calculate an inverted point spread function based on predetermined parameters of vision impairment, a first filter configured to increase a brightness of image data, a second filter to increase the dynamic contrast range of image data and a de-convolution filter, wherein the computer program product is configured to apply the deconvolution filter on original image data with the result of the inverted point spread function, wherein the first brightness increase filter is applied after the application of the deconvolution filter, and wherein the second contrast increase filter is directly applied after the first brightness increase filter.

5. Electronic glasses according to claim 4, wherein the computer program product comprises a color change module for transforming the second increased contrast image data with a set of predetermined complementary colors of a color model to generate the image data to be displayed on a display of the electronic glasses.

* * * * *